(No Model.)

R. HALE.
Implement for Gathering Fruit.

No. 233,410.  Patented Oct. 19, 1880.

Witnesses
J. Walter Fowler.
W. H. Morsell

Inventor;
Robt. Hale
by A. H. Evans & Co
Attys.

UNITED STATES PATENT OFFICE.

ROBERT HALE, OF MINNEAPOLIS, MINNESOTA.

IMPLEMENT FOR GATHERING FRUIT.

SPECIFICATION forming part of Letters Patent No. 233,410, dated October 19, 1880.

Application filed August 5, 1880. (No model.)

*To all whom it may concern:*

Be it known that I, ROBERT HALE, of Minneapolis, Hennepin county, State of Minnesota, have invented a new and useful Improvement in Implemements for Gathering Fruit, &c.; and I hereby declare the following to be a full, clear, and exact description thereof, reference being had to the accompanying drawings, making part of this specification, in which—

Figure 1:
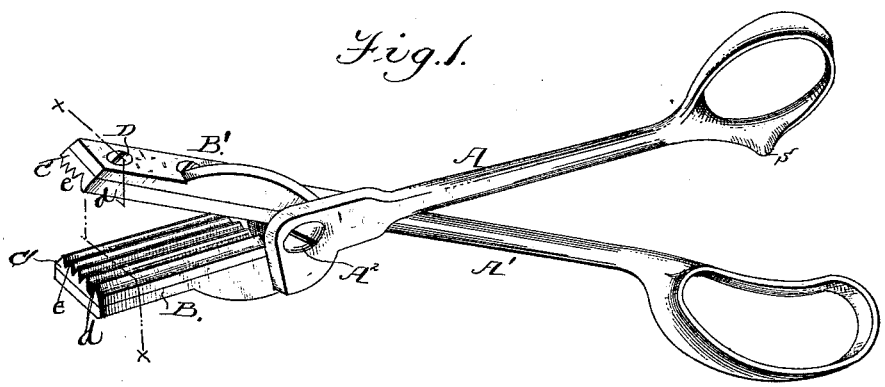
Figure 2:
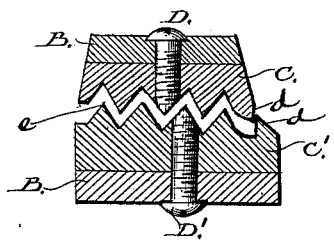

Figure 1 is a perspective view of my invention. Fig. 2 is a sectional view of the jaws on line $x$ $x$ of Fig. 1 with the cutters closed.

The object of my invention is to provide a means for gathering fruit or flowers in such a manner that all handling of the same may be avoided, the device being so constructed that it shall cut and at the same time hold the fruit.

In order that others skilled in the art may make and use my invention, I will describe the exact manner in which I have carried it out.

In the said drawings, A and A' are the operating-handles of my cutting implement, which may be made in any convenient form. In Fig. 1 I have shown them in the form of the ordinary levers or handles of shears; but they may also be constructed with long handles for gathering fruit from high growths—such as vines, trees, &c. These handles or levers are pivoted at $A^2$.

The jaws B and B' are cast in one piece with the handles.

C and C' are plates bolted on the inner faces of the jaws, and upon which are formed the cutting-blades and grasping device. These plates are secured to the jaws by the screws D and D', as shown in Fig. 2. Upon the inner faces of these plates C and C' are formed the cutting-blades $d$, which are placed at one side of the plate and operate like the blades of shears. Upon the remainder of the inner faces of the plates are formed alternate grooves and ridges $e$, the ridges of one plate being opposite the grooves on the other, but they do not meet; otherwise they would fracture the stem and thereby drop the fruit.

In order that the plates C and C' may not meet, I form a spur, $s$, on one of the handles, (shown in the illustration, Fig. 1,) at the side of one of the finger-rings, which will strike the opposite handle before the plates C C' meet.

The operation of the implement is as follows: The handles are held in the hand in the same manner as ordinary shears, and the stem or twig is brought between the jaws with the fruit on the opposite side from the cutting-blades, when the jaws are brought together and the cutting-blades sever the twig or stem, which is immediately grasped by the corrugated surfaces of the plates C and C' and prevented from falling, and avoiding any grasp by the hand of the operator. To release the stem or twig it is only necessary to open the jaws, and the fruit falls into the receptacle provided for it.

When it is necessary to use the implement upon high growths — such as trees, vines, &c.—the levers are extended in the form of long bars or handles, which enables the operator to reach the fruit without the aid of ladders, &c., while the operation is substantially the same.

I am aware that flower and fruit gatherers have heretofore been made wherein stem-grasping devices and cutting-blades have been combined in the same cutting-jaws, and hence I make no broad claim to such construction; but,

Having thus described my invention, what I claim as new, and desire to secure by Letters Patent, is—

In a fruit and flower gathering device having handles A A' and spur $s$, the plates C C', having angular longitudinal grasping-blades $e$ $e$ and cutting-blades $d$ $d$ on one edge thereof, all constructed and arranged as set forth.

In presence of—     ROBERT HALE.
GEO. H. RUST,
H. B. HUNTINGTON.